United States Patent [19]

Nagatsuka et al.

[11] Patent Number: 4,664,212
[45] Date of Patent: May 12, 1987

[54] VACUUM WALL CRAWLER

[75] Inventors: Kenichi Nagatsuka, Yokohama; Hidenori Watanabe, Tokyo, both of Japan

[73] Assignees: Mitsubishi Kakoki Kaisha Ltd.; Kakoki Engineering Service Co., Ltd., both of Tokyo, Japan

[21] Appl. No.: 758,443

[22] Filed: Jul. 24, 1985

[30] Foreign Application Priority Data

Aug. 14, 1984 [JP] Japan .................. 59-169825

[51] Int. Cl.⁴ .............................. B62D 55/26
[52] U.S. Cl. ................... 180/164; 180/9.64; 180/119; 180/901; 305/35 EB
[58] Field of Search ........ 180/9.1, 9.64, 901, 180/164, 119, 9.5, 125, 129; 114/222; 414/744 B; 305/35 EB, 43

[56] References Cited

U.S. PATENT DOCUMENTS

| 1,581,849 | 7/1921 | Madsen et al. | 114/222 |
|---|---|---|---|
| 3,170,532 | 2/1965 | Boppart | 180/164 |
| 3,597,017 | 8/1971 | Tanaka | 180/9.1 |
| 3,777,834 | 12/1973 | Hiraoka | 114/222 |
| 3,810,515 | 5/1974 | Ingro | 180/164 |
| 3,991,842 | 11/1976 | Larsen et al. | 180/164 |
| 4,044,862 | 8/1977 | Savarimuthu | 180/164 |
| 4,132,279 | 1/1979 | van der Lende | 180/9.5 |

FOREIGN PATENT DOCUMENTS

| 51-634 | 4/1977 | Japan | 180/164 |
|---|---|---|---|
| 1379885 | 1/1975 | United Kingdom | 180/164 |
| 1555664 | 11/1979 | United Kingdom | 414/744 B |
| 1580699 | 12/1980 | United Kingdom | 180/9.5 |

Primary Examiner—John J. Love
Assistant Examiner—Everett G. Diederiks, Jr.
Attorney, Agent, or Firm—Oblon, Fisher, Spivak, McClelland & Maier

[57] ABSTRACT

A vacuum wall crawler is provided with a pair of endless belts at both sides of the frame, the pair of endless belts having at their outer surfaces a plurality of recesses each of which has a through hole. Air in the recesses is sucked through suction chambers, each corresponding to one of the recesses, by an ejector independently provided in conformity with the suction chambers.

6 Claims, 4 Drawing Figures

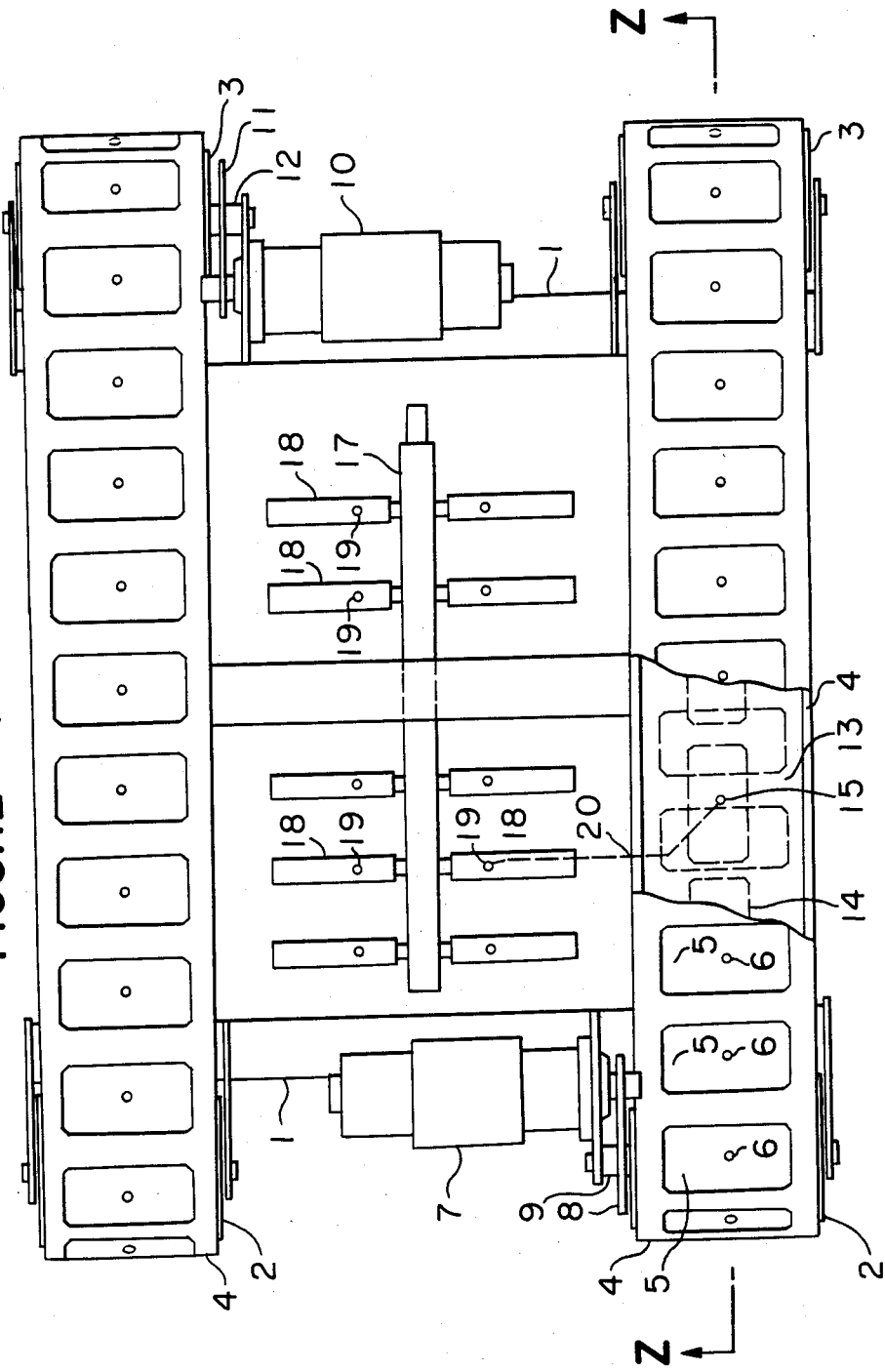

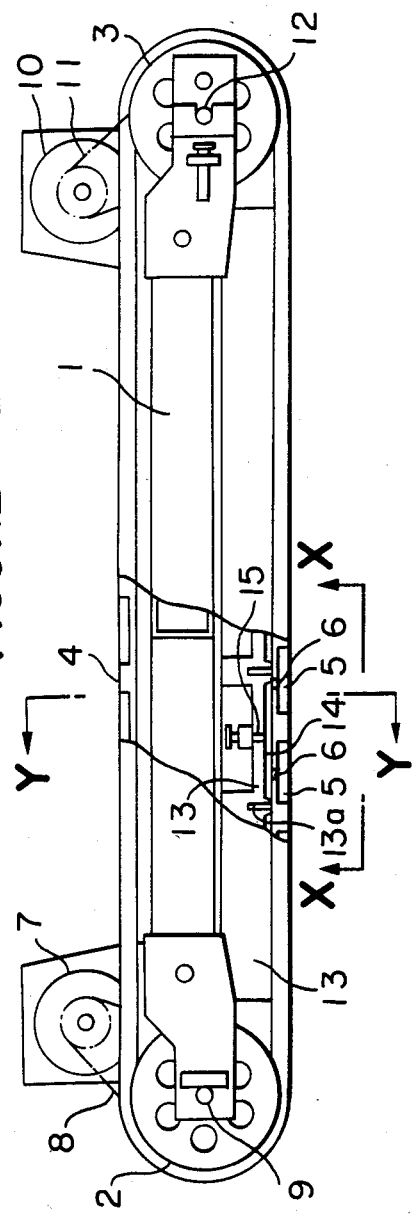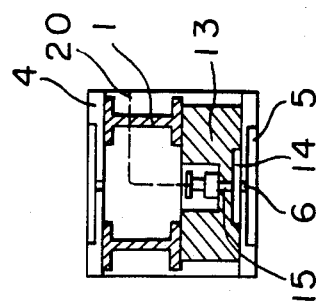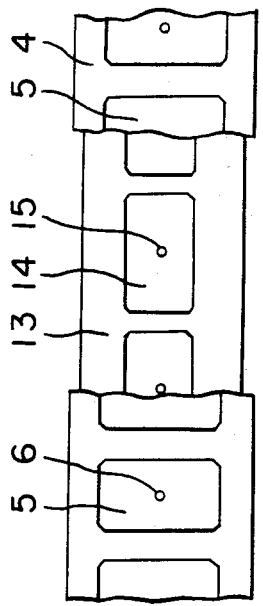

VACUUM WALL CRAWLER

BACKGROUND OF THE INVENTION

The present invention relates to a vacuum wall crawler. More particularly, it relates to a remote-controlled vacuum wall crawler.

There have been proposed various type of automatic working devices with wheels which are operated by remote control and which are used at a height or in dangerous circumstances for work such as periodic cleaning, derusting, decontamination of radioactivity, inspection etc. of walls made of metal or concrete of tall buildings, giant storage tanks, ships, nuclear power plants, dams for water power plant and so on.

The conventional automatic working devices have, however, adopted such construction that vacuum suction discs are brought into contact with the walls to move the working device. Accordingly, when a working device is used for a wall having a coarse surface such as a concrete wall, it causes high friction resistance to hinder smooth movement. Further, the suction discs easily undergoes abrasion, whereby the working device may be dropped due to insufficient self-holding function. Thus, the conventional automatic working device could not provide safe and reliable operation for a long term.

SUMMARY OF THE INVENTION

It is an object of the present invention to provide a vacuum wall crawler of a small size and a light weight which assures safe and reliable operation for a long term with sufficient self-holding function against coarse surface walls and minimizing abrasion of suction discs.

The foregoing and the other objects of the present invention have been attained by providing a vacuum wall crawler which comprises a substantially rectangular frame; front and rear pulleys pivotally supported at both sides of the front and rear parts of the frame; a right endless belt wound around the front and rear pulleys on the right side; a left endless belt wound around the front and rear pulleys on the left side, each endless belt having a plurality of recesses in the outer surface over its entire length and each recess having a through hole communicating the outer surface with the inner surface of the endless belt; right and left support beams provided at the right and left lower parts of the frame to extend in the longitudinal direction of the frame so that the inner surfaces of the endless belts are in contact with the right and left support beams, each support beam having a plurality of suction chambers in the lower surface along the longitudinal direction and each suction chamber having a communication hole communicating the lower surface of the support beam with the upper surface; a vacuum source; and a plurality of air ejectors which are actuated by the detection of vacuum from the vacuum source, each air ejector being connected independently to each of the suction chambers to suck air in the suction chamber when actuated.

BRIEF DESCRIPTION OF THE DRAWINGS

A more complete appreciation of the inventon and many of the attendant advantages thereof will be readily obtained as the same becomes better understood by reference to the following detailed description when considered in connection with the accompanying drawings, wherein:

FIG. 1 is a plane view partly broken of an embodiment of the vacuum wall crawler according to the present invention;

FIG. 2 is a longitudinal cross-sectional view taken along a line Z—Z in FIG. 1;

FIG. 3 is a bottom view partly broken in view of a line x—x in FIG. 2; and

FIG. 4 is a cross-sectional view taken along a line Y—Y in FIG. 2.

DETAILED DESCRIPTION OF THE PREFERRED EMBODIMENT

An embodiment of the present invention will be discribed with reference to the drawings.

In FIGS. 1 and 2, a reference numeral 1 designates a substantially rectangular frame. Front pulleys 2, 2 are rotatably supported with their axes aligned with each other at the right and left sides of the front part of the frame 1, and rear pulleys 3, 3 rotatably supported with their axes aligned with each other at the right and left sides of the rear part of the frame 1. The rear pulleys 3, 3 are adjustably mounted on the frame 1 so that the shafts 12, 12 of the rear pulleys can be moved to some extent along the longitudinal direction of the frame 1. Endless belts 4, 4 made of a resilient material are respectively extended between the left front pulley 2 and the left rear pulley 3 and between the right front pulley 2 and the right rear pulley 3 with a suitable tension. In the outer surface of each of the endless belts 4, substantially rectangular recesses 5 having a desired depth are formed at constant intervals over the entire length of the endless belt. A through hole 6 which communicates the outer surface of the endless belt 4 with the inner surface thereof is formed in each of the recesses 5.

A front motor 7 which may be an electrical motor or an air motor is mounted on the front part of the frame 1. A driving force of the front motor 7 is transmitted to the pulley shaft 9 of the front pulley 2 at the left side of the frame 1 through a chain 8 via a sprocket. A rear motor 10 which may be an electrical motor or an air motor is mounted on the rear part of the frame 1. A driving force of the rear motor 10 is transmitted to the pulley shaft 12 of the rear pulley 3 at the right side of the frame through a chain 11 via a sprocket. Right and left support beams 13 are provided at the right and left lower parts of the frame 1 so as to extend in the longitudinal direction of the frame 1 with their lower surfaces in close-contact with the inner surfaces of the endless belts 4. Each of the support beams 13 has plurality of slits 13a extending in the transversal direction of the support beam so that it possesses some flexibility in the vertical direction. A plurality of rectangular suction chambers 14 are formed in the lower surface of the support beams 13 at suitable intervals over the entire length of the beams. Each of the suction chambers 14 is formed so that it can extend over two adjacent through holes 6, 6 of the endless belts 4. Accordingly, at least one of each two adjacent recesses 5 is in a vacuum condition. A communication hole 15 is formed in each of the suction chambers 14 to communicate the upper surface of the support beams with the lower surface.

A header pipe for vacuum pipe 17 is placed along the center line in the longitudinal direction of the frame 1. The rear end of the header pipe 17 is connected to a vacuum source placed away from the vacuum wall crawler of this embodiment through a hose (not shown). A plurality of air ejectors 18 are connected to the header pipe 17 in the frame 1 in a symmetrical manner at the right and left sides of the header pipe. Each of the air ejectors 18 has an air suction nozzle 19. The ejectors when actuated by vacuum from the header pipe 17 will suck air. The number of the air ejectors 18 corresponds to number of the suction chambers 14 formed in the support beams 13. The suction nozzle 19 in each of the air ejectors 18 is connected to one communication hole 15 of each of the suction chambers 14 by means of a hose 20.

In the vacuum wall crawler, when a vacuum is supplied to the header pipe 17 through a hose, the air ejectors 18 are actuated. Air in the each suction chamber 14 formed in the support beams 13 is sucked independently by each air ejector 18 through the communication holes 15, the hoses 20 and the air suction nozzle 19 to render each of the suction chambers 14 to be in a vacuum condition. Accordingly, air in the recesses 5 formed in the endless belts 4 is sucked through the through holes 6, whereby the each recess section in the right and left endless belts perform the function of independent suction discs, and accordingly the vacuum wall crawler is strongly attracted to a coarse wall surface.

When the front and rear motors 7, 10 are driven, the front and rear pulleys 2, 3 are driven through the chains 8, 11 respectively and the right and left endless belts 4, 4 are turned in an endless fashion, whereby the crawler of the present invention moves along the wall surface without falling from it due to a frictional force produced between the walls and the endless belts. In order to perform smooth sliding movement between the endless belts 4 and the support beams 13 when the crawler of the present invention is moved, it is desirable that a plate of stainless steel having a small friction coefficient is attached to the contacting surface between the support beams 13 and endless belts 4 to reduce friction force between them. Further, it is preferable to attach an elastically fitting material such as sponge rubber on the bottom surface of the support beams 13 so as to provide sealing effect between the support beams 13 and endless belts 4.

The vacuum wall crawler of the present invention provides the following effects.

(1) The recesses formed in the endless belts are always communicated with the suction chambers formed in the support beams and the air ejectors are independently provided with suction corresponding to the suction chambers of the support beams. Accordingly, even though the vacuum condition of some of the recesses in the endless belts is broken, an attracting force permitting the crawler to run along the vertical wall surface or a ceiling wall without faling regardless of unevenness of the wall surface, is obtainable by the remaining recesses.

(2) Since the right and left endless belts are driven by the front and rear motors respectively, direction control such as turning to the right or left, control of running speed, forward or backward driving and so on are possible by operating each of the motors through remote-control.

(3) The support beams have some flexibility and are supported by the frame. Accordingly, the endless belts can be conformed with and attracted to a curved wall surface, whereby the crawler of the present invention can be moved along the curved wall surface.

(4) The shaft of the each of the rear pulleys is pivotally supported by the frame so as to be adjusted in the longitudinal direction. By adjusting the position of the shafts in accordance with elongation of the endless belts, an optimum tention is always imparted to the endless belts to allow reliable running of the crawler.

(5) Air motors are used as driving motors to use compressed air as power sources. Accordingly, safe running can be obtainable even in dangerous circumstances which may cause explosion.

In accordance with the vacuum wall crawler of the present invention, safe, reliable and smooth operations are attainable and a problem of wearing of the suction discs can be eliminated.

We claim:

1. A vacuum wall crawler which comprises:
a substantially rectangular frame;
front and rear pulleys pivotally supported at both sides of front and rear parts of said frame;
a right endless belt wound around the front and rear pulleys on the right side;
a left endless belt wound around the front and rear pulleys on the left side, each said endless belt having a plurality of recesses in an outer surface thereof over the entire length thereof and each said recess having a through hole communicating the outer surface thereof with an inner surface of said endless belt;
right and left support beams provided at right and left lower parts of said frame and extending in the longitudinal direction of said frame so that the inner surfaces of said endless belts are in contact with said right and left support beams, each said support beam having a plurality of suction chambers in a lower surface thereof, said suction chambers extending along the longitudinal direction and each suction chamber having a communication hole communicating the lower surface of said support beam with an upper surface thereof;
a vacuum source; and
a plurality of air ejectors which are actuated by a vacuum from said vacuum source, each said air ejector being connected independently to one of said suction chambers to suck air from said suction chambers when actuated.

2. The vaccum wall crawler according to claim 1, wherein said right and left endless belts are each driven by an air motor.

3. The vacuum wall crawler according to claim 1, wherein the shaft of each of said rear pulleys is pivotally supported by said frame so as to be adjustable in the longitudinal direction of said frame.

4. The vacuum wall crawler according to claim 1, wherein said support beams possess flexibility in the vertical direction.

5. The vacuum wall crawler according to claim 1, wherein said suction chambers are formed in said support beams at fixed intervals over the entire length thereof and said recesses are formed in said endless belts at fixed intervals over the entire length thereof.

6. The vacuum wall crawler according to claim 1, wherein said suction chambers are formed in said support beams so as to extend over two adjacent recesses formed in said endless belts.

* * * * *